US012589612B2

(12) United States Patent
Vergnes

(10) Patent No.: US 12,589,612 B2
(45) Date of Patent: Mar. 31, 2026

(54) MODULAR DESKTOP CRAFT UTENSILS STORAGE SYSTEM FOR STORING CRAFT UTENSILS

(71) Applicant: Direct Sales B.V., Terherne (NL)

(72) Inventor: Franciscus Maria Vergnes, Terherne (NL)

(73) Assignee: Direct Sales B.V., Terherne (NL)

( * ) Notice: Subject to any disclaimer, the term of this patent is extended or adjusted under 35 U.S.C. 154(b) by 94 days.

(21) Appl. No.: 18/024,067

(22) PCT Filed: Sep. 17, 2021

(86) PCT No.: PCT/EP2021/075618
§ 371 (c)(1),
(2) Date: Mar. 1, 2023

(87) PCT Pub. No.: WO2022/058497
PCT Pub. Date: Mar. 24, 2022

(65) Prior Publication Data
US 2023/0264512 A1 Aug. 24, 2023

(30) Foreign Application Priority Data
Sep. 17, 2020 (NL) ...................................... 2026494

(51) Int. Cl.
*B65D 21/02* (2006.01)
*B43M 99/00* (2010.01)

(52) U.S. Cl.
CPC ................................. *B43M 99/008* (2013.01)

(58) Field of Classification Search
CPC ...... A45C 11/34; B43M 99/008; A47G 21/14; A47G 21/145
USPC ........ 206/501, 509–511, 553, 561, 214, 224, 206/371; 211/70.7; 220/553–555
See application file for complete search history.

(56) References Cited

U.S. PATENT DOCUMENTS 3,514,170 A * 5/1970 Shewchuk ............. A47B 87/02 312/107
3,807,572 A * 4/1974 Luvara .................. A47B 57/58 211/187
4,429,932 A 2/1984 Brennan
4,807,760 A * 2/1989 Sussman ................ A47B 88/90 206/371

(Continued)

FOREIGN PATENT DOCUMENTS

CN 109435550 A 3/2019
FR 2 354 890 A 1/1978
GB 2 185 238 A 7/1987

*Primary Examiner* — Luan K Bui
(74) *Attorney, Agent, or Firm* — Hoffmann & Baron, LLP

(57) ABSTRACT

A modular desktop craft utensils storage unit for storing craft utensils includes a bottom wall, a top wall and two side walls, which together define an interior of the storage unit for receiving one or more craft utensils. One of the bottom wall or the top wall includes at least one male coupling device, which protrudes from the respective bottom wall or top wall and the other one of bottom wall or the top wall includes at least one female coupling device, which is formed by a recess in the respective bottom wall or top wall. The male coupling device of the storage unit is adapted to interlock with the female coupling device of another storage unit and the female coupling device of the storage unit is adapted to interlock with the male coupling device of yet another storage unit.

19 Claims, 9 Drawing Sheets

(56) References Cited

U.S. PATENT DOCUMENTS

| | | | | | |
|---|---|---|---|---|---|
| 5,469,961 | A * | 11/1995 | Chang | F16K 41/12 | |
| | | | | 206/307 | |
| 5,740,906 | A * | 4/1998 | Lai | B43M 99/008 | |
| | | | | 206/214 | |
| 6,431,436 | B1 * | 8/2002 | Evers | B65D 5/006 | |
| | | | | 206/821 | |
| 6,557,955 | B2 * | 5/2003 | Saravis | A47B 47/0033 | |
| | | | | 403/381 | |
| 8,695,795 | B1 * | 4/2014 | Huber | A47B 87/0292 | |
| | | | | 312/107 | |
| 8,875,888 | B2 * | 11/2014 | Koenig | B65D 21/0223 | |
| | | | | 206/508 | |
| 9,101,212 | B2 * | 8/2015 | De Roeck | A47B 87/0284 | |
| 2006/0076261 | A1 * | 4/2006 | Kurtenbach | A47B 87/0292 | |
| | | | | 206/424 | |
| 2013/0126387 | A1 * | 5/2013 | Rowe | A47G 21/14 | |
| | | | | 206/553 | |
| 2013/0146498 | A1 * | 6/2013 | Chen | B65D 21/0202 | |
| | | | | 206/509 | |

* cited by examiner

MODULAR DESKTOP CRAFT UTENSILS STORAGE SYSTEM FOR STORING CRAFT UTENSILS

CROSS-REFERENCE TO RELATED APPLICATIONS

This application is the National Stage of International Application No. PCT/EP2021/075618, filed Sep. 17, 2021, which claims the benefit of Netherlands Application No. 2026494, filed Sep. 17, 2020, the contents of which is incorporated by reference herein.

FIELD OF THE INVENTION

The present invention relates to a modular desktop storage unit for storing craft utensils, such as pens, pencils and/or markers. The present invention further relates to a modular desktop storage system and to a modular set of craft utensils.

STATE OF THE ART

At present, various types of storage units exist for storing craft utensils on a desktop or in a storage cabinet. Such storage units can be used to accommodate the craft utensils, like pens, pencils and/or markers when not in use. Such craft utensils generally have an elongate tubular form, which allows them to be stored vertically, e.g. standing in an open-top box, or horizontally, e.g. lying in horizontal storage spaces that are accessible from the side.

In particular in the field of crafting, extensive sets of utensils are used to express the user's creativity. It is convenient to store the craft utensils in an organized way, such that the user may directly see the specific type of craft utensil that he or she wishes to use, and at the right colour.

From GB 2 185 238 A, a modular storage unit for craft utensils is known. The unit comprises a bottom wall, a top wall and two side walls to define an interior. Each unit comprises a coupling device, which enables the unit to be interconnected with another unit. With such a modular storage unit, the overall size of all interconnected storage units, e.g. of the modular storage system, can be adapted by adding or removing storage units.

This known modular storage unit, however, has the drawback that it only allows interconnecting of storage units in a single, e.g. horizontal plane. This means that the modular storage system can only expand in a single horizontal direction, which is not efficient for use on a desktop, as it take up a large piece of valuable desktop space.

Furthermore, these known coupling devices rely on a snap-fit connection between the storage units, which allows for convenient coupling, but which is difficult to uncouple. This reduces the flexibility of the modular storage system, since uncoupling of the storage unit can be needed often, e.g. when it is desired to re-arrange the storage units or when it is desired to increase or decrease the size of the storage system.

From FR 2 354 890, a pen cap is known, which has a single port to receive a single pen and which is horizontally interconnectable with other pen caps. The pen cap thereto comprises two grooves and two ridges, which are interconnectable to form dovetail joints between adjacent pen caps. The ridges are located on opposed sides of the cap, i.e. in a 12 and 6 o'clock position, seen from above, and the grooves are located on opposed sides of the cap as well, i.e. in a 3 and 9 o'clock position. To interconnect the pen caps, each two adjacent caps thus need to be rotated 90° with respect to each other, to allow for interconnection between a groove and a ridge.

OBJECT OF THE INVENTION

It is therefore an object of the invention to provide a modular desktop storage unit for storing craft utensils that lacks one or more of the above-mentioned drawbacks, or at least to provide an alternative modular desktop storage unit.

DETAILED DESCRIPTION

The present invention provides a modular desktop storage unit for storing craft utensils, such as pens, pencils and/or markers. The storage unit comprises a bottom wall, a top wall, spaced in a vertical direction at a distance from the bottom wall, and two side walls, each vertically extending in between the bottom wall and the top wall at opposite sides thereof. It is noted here that the orientation with respect to the vertical direction is defined during normal use of the modular storage unit, e.g. during the storing of the craft utensils. It is understood that the storage unit may also be used to store other articles, such as tools, hardware articles and/or beauty articles, like lipsticks and/or nail polishes.

Two or more of the walls of the storage unit are connected to each other, preferably integrally connected, e.g. in which all walls are made from the same material. The walls of the storage unit may be made of a plastic material and can be manufactured by means of an injection-moulding process.

The bottom wall, the top wall and the side walls together define an interior of the storage unit for receiving one or more craft utensils along a horizontal insertion direction. It is noted here that the orientation of the horizontal insertion direction is also defined during normal use of the modular storage unit, e.g. during the storing of the craft utensils.

The storage unit further comprises a coupling device, which is configured to interlock with a coupling device of another storage unit to interconnect the storage unit and the other storage unit with each other, i.e. to interlock with each other in horizontal directions only. Preferably, the storage unit comprises multiple coupling devices, e.g. at multiple different walls, to enable multiple walls of the storage unit to be connectable to different walls of the other storage unit. The coupling devices are preferably fixedly connected to the respective walls of the storage unit, for example being integrally connected thereto, and may be made of the same material as the walls of the storage unit, for example being made of the same plastic material and manufactured by means of the same injection-moulding process.

According to the present invention, one of the bottom wall or the top wall comprises at least one male coupling device, which protrudes from the respective bottom wall or top wall in a vertical direction, during use of the storage unit. This means that either the bottom wall or the top wall, but not both of them, is provided with the one or more male coupling devices. Compared to a nominal plane of this respective bottom wall or top wall, e.g. a remainder of the horizontal plane of the bottom wall or top wall in between the male coupling devices, the male coupling devices have an elevated profile. Depending on whether they are provided on the bottom wall or the top wall, the male coupling devices respectively project below or above the nominal planes of these walls.

Further according to the present invention, the other one of the bottom wall or the top wall comprises at least one female coupling device, which is formed by a recess in the respective bottom wall or top wall. This means that the other one of the bottom wall or the top wall, e.g. the one that is not provided with the male coupling devices, is provided with one or more recesses. Compared to the nominal plane of this respective bottom wall or top wall in between the female coupling devices, the female coupling devices have a depressed profile. The female coupling devices, e.g. the recesses, may be provided as grooves, holes, indents or any other kind of hollow openings, and may either be through openings or blind openings, e.g. with a transverse wall defining an end of the opening. Depending on whether the female coupling devices are provided on the bottom wall or the top wall, they respectively protrude into the nominal planes of these walls in an upright vertical direction or in a downward vertical direction.

The male coupling device of the storage unit is adapted to interlock with the female coupling device of the other storage unit. In particular, when the storage unit has the male coupling devices on its bottom wall, it may be arranged on the top wall of the other storage unit, e.g. with identical outer contour, that has the female coupling devices on its top wall. Alternatively, when the storage unit has the female coupling devices on its bottom wall, it may be arranged on the top wall of the other storage unit, e.g. with identical outer contour, that has the male coupling devices on its top wall.

The female coupling device of the storage unit is adapted to interlock with the male coupling device of yet another storage unit. In particular, when the storage unit has the female coupling devices on its top wall it may be arranged underneath the bottom wall of the yet other storage unit, e.g. with identical outer contour, that has the male coupling devices on its bottom wall. Alternatively, when the storage unit has the male coupling devices on its top wall, it may be arranged underneath the bottom wall of the yet other storage unit, e.g. with identical outer contour, that has the female coupling devices on its bottom wall.

The interlocking of the coupling devices may be effected by the male coupling devices protruding into the female coupling devices in the vertical direction. This may result in a shape-fit of the male coupling devices within the female coupling devices, thereby preventing mutual movements in a horizontal plane between the coupling devices, and therefore also preventing horizontal mutual movements between the different storage units that are stacked on top of each other.

The interlocking between the male coupling devices and the female coupling device may be obtained in a horizontal plane alone, i.e. in a plane parallel to the top wall and the bottom wall. No interlocking may be present in a vertical direction, i.e. in a vertical direction parallel to the side walls. As such, the coupling devices may only interlock to prevent against mutual horizontal displacements between the storage units, whereas they will not interlock against mutual vertical displacements. Accordingly, the storage units may be held in place vertically under influence of gravitational forces alone.

The storage unit according to the present invention provides the advantage of enabling convenient stacking of multiple storage units in the vertical direction, whilst preventing horizontal movements in between them by the interlocking male coupling devices and female coupling devices. This interlocking may prevent sideways shifting of the storage units and may prevent that a higher storage unit can drop from a lower storage unit. Instead, a rigid stack of storage units may be obtained that may only occupy a desktop footprint of a single storage unit. This means that the amount of desktop space needed to store a certain number of craft utensils is far less than with the known modular storage units that only allow interconnection of the storage units in a horizontal plane.

Furthermore, the coupling devices of the storage units merely require the male coupling devices to be inserted in the female coupling devices to obtain the connection, wherein the coupling devices merely rely on gravitational forces, e.g. acting in the vertical direction, to hold them in place. For uncoupling the storage units, it would suffice to only lift an upper one of the storage units and it is not required to actively release the coupling, like with the snap-fit coupling in the known storage unit. As such, the storage unit according to the present invention can be used more flexibly and allows for an improved re-arrangement.

In an embodiment, not all walls of the storage unit are fixedly connected to each other. The bottom wall and the side walls may be fixedly connected two each other, for example being integrally connected and manufactured by means of an injection-moulding process. The top wall may be provided as a separate cover that can be removably attached to the side walls of the storage unit.

According to this embodiment, the interior of the storage unit may be defined by the bottom wall and the side walls. With the top wall arranged on the side walls as a cover, the interior is further closed-off by the top wall. In the absence of a cover, instead, the interior of the storage unit may be accessible from above.

The top wall may comprise the respective male coupling devices or female coupling devices also when it were to be provided as a removable cover. Without the cover, this storage unit may be open from the top, whereas further storage units may be stacked thereon when its cover is in place on the side walls.

In an embodiment, the male coupling device has an elongate, for example a rectangular or oval cross-section, when seen in the vertical direction, the female coupling device has a circular cross-section, when seen in the vertical direction, and a horizontal width of the elongate male coupling device substantially corresponds to the diameter of the circular female coupling device.

It was found by the inventor that a connection between a elongate male coupling device within a circular female coupling device allows for convenient insertion and removal whilst still having a good interlocking for preventing mutual horizontal movements between the storage units, in particular compared to when both the male coupling devices and the female coupling device were to be provided elongate or circular.

In a further embodiment, at least one of the male coupling devices substantially extends in a transverse horizontal direction, aligned perpendicular to the horizontal insertion direction, and the horizontal width of this elongate male coupling device in the transverse horizontal direction substantially corresponds to the diameter of the circular female coupling device.

As such, the dimensions of the male coupling device in the transverse horizontal direction correspond to the dimensions of the female coupling device in the transverse horizontal direction, in order to obtain a sufficiently tight shape-fit between them, for optimally preventing mutual horizontal movements between the storage units.

In an embodiment, the storage unit further comprises a grid, which is arranged in the interior of the storage unit and which defines a plurality of craft utensil storage spaces, wherein each storage space is adapted to receive a single craft utensil, to be inserted therein in the horizontal insertion direction.

With the grid, the entire interior of the storage unit is subdivided into multiple smaller storage spaces. Each storage space is configured to freely receive a single craft utensil in a way that insertion thereof is always possible, irrespective of whether other craft utensils are already present in the storage unit. Each storage space is accessible from the side, e.g. in the horizontal insertion direction, so that head ends of the craft utensils, which may generally display information about the type of craft utensil and/or its colour, may be visible for the user.

In a further embodiment, the grid comprises one or more vertical grid walls in the interior of the storage unit, which extend in between the bottom wall and the top wall in the vertical direction, wherein the vertical grid walls define multiple craft utensil storage spaces arranged next to each other in the transverse horizontal direction.

According to this embodiment, the interior of the storage unit is subdivided into multiple storage spaces that may substantially extend in a vertical direction, for example extending over the entire height of the storage unit between the opposed bottom wall and top wall. The storage spaces may each be defined from one side by a side wall and from the other side by a vertical grid wall or may be defined by a vertical grid wall from both sides.

In an additional or alternative embodiment, the grid comprises one or more horizontal grid walls in the interior of the storage unit, which extend in between the side walls in the transverse horizontal direction, wherein the horizontal grid walls define multiple craft utensil storage spaces arranged above each other in the vertical direction.

According to this embodiment, the interior of the storage unit is subdivided into multiple storage spaces that may substantially extend in the transverse horizontal direction, for example extending over the entire width of the storage unit between both opposed side walls. The storage spaces may each be defined by the top wall and from the bottom by a horizontal grid wall or may be defined by the bottom wall and from the top by a horizontal grid wall or may be defined by a horizontal grid wall at the bottom and at the top.

In an embodiment with both vertical grid walls and horizontal grid walls, the storage spaces do not extend over the entire height and/or entire width of the storage unit. Instead, the interior of the storage unit may be subdivided both in the vertical direction and the horizontal direction.

Different storage units may each comprise a different number of vertical grid walls and/or horizontal grid walls, so that a distance between two adjacent vertical grid walls and/or two adjacent horizontal grid walls may be different for each of the different storage units. As a result, the size of the storage spaces may differ between these different storage units, whilst their outer contours may be the same. As a result, each of these storage units may receive craft utensils of a different size or shape, e.g. with a different cross-sectional area, whilst the modularity of the storage units, e.g. the ability to be interconnected with other storage units, remains safeguarded due to the same outer contour.

In an embodiment, the storage unit comprises a drawer, which is slidably arranged at least partially in the interior of the storage unit and which comprises a reception volume for receiving craft utensils and/or stationery articles.

The drawer may be slidable along the horizontal insertion direction, so that a user may open the drawer in the same direction in which the craft utensils are to be pulled out of the storage unit.

In an embodiment, the storage unit further comprises a cover element, which is removably positioned against the walls of the storage unit to cover the plurality of craft utensil storage spaces from the front.

The cover element is configured to be attached to the top wall, the bottom wall and the side walls of the storage unit, i.e. at a frontal side of the storage unit. As such, the cover element is configured to shield the interior of the storage unit from the front, to prevent access into the interior from outside the storage unit and to prevent undesired removal of writing utensils out of the interior, i.e. out of the craft utensils storage spaces.

The cover element may comprise a head wall, which is aligned perpendicular to the top wall, the bottom wall and the side walls when the cover element is installed against the walls of the storage unit. The cover element may further comprise an annular rim, attached to the head wall, with which the cover element abuts the walls of the storage unit. An outer contour of the annular rim may substantially correspond to the outer contour of the storage unit, i.e. to the outer contour of the top wall, the bottom wall and the side walls, being substantially flush therewith.

The annular rim may comprise a recessed part, which has an outer contour that corresponds to an inner contour of the of the storage unit, i.e. to the inner contour of the top wall, the bottom wall and the side walls, so that the cover element is configured to interlock with the walls of the storage unit by means of its annular rim, by obtaining a shape fit between the annular rim and the walls of the storage unit.

In a further embodiment, the cover element is a transparent cover element, for example made of a transparent plastic, such as polycarbonate or Perspex or polyethylene. The transparent cover element provides the benefit that a user can look into the interior of the storage unit to see whether writing utensils are accommodated in the interior of the storage unit and, if so, what type and/or colour these writing utensils are or have.

In an embodiment, the storage unit further comprises an elastic band, configured to be positioned to surround the storage unit and to hold the cover element in place against the walls and/or to hold the drawer at least partially in the interior of the storage unit.

The elastic band may be made of rubber or elastic cloth and is configured to be positioned around the storage unit. The elastic band may, for example, be positioned to surround the cover element, both side walls and a rear wall of the storage unit. Alternatively, the elastic band may extend vertically in front of one or multiple drawers of the storage unit, thereby surrounding the drawers, the bottom wall, the top wall and the rear wall of the storage unit.

The elastic band is beneficial when the storage unit is intended to be used in a mobile manner, i.e. being intended to be transported between multiple different locations for use. The elastic band may, in particular during transport, be configured to prevent undesired removal of the cover element and/or undesired sliding of the drawers.

In an embodiment, the modular storage unit comprises four male coupling devices and four female coupling devices. The four male coupling devices are mutually arranged to form corner points of a rectangular male coupling pattern and the four female coupling devices are mutually arranged to form corner points of a rectangular female coupling pattern. The rectangular male coupling pattern substantially corresponds to the rectangular female coupling pattern.

In this way, the four male coupling devices may be located exactly above or below the four female coupling devices, depending on whether the male coupling device are respectively provided in the top wall or the bottom wall.

When the storage unit is arranged on top of another storage unit, e.g. with identical outer contour, their coupling devices project in the same rectangular patterns, which allows for convenient insertion of the male coupling devices of one storage unit into the female coupling device of another storage unit.

According to this embodiment, the storage unit may comprise more than four male coupling devices, as long as four of them are located at the corner points of the rectangular male coupling pattern. Possible further male coupling devices may be located at edges of the rectangular male coupling pattern, e.g. in between the corner points. For example, one edge of the rectangular male coupling pattern may comprise one or more further male coupling devices and another edge, e.g. an opposite edge, may also comprise one or more further male coupling devices, so that the overall pattern of the male coupling devices may be mirror symmetrical.

Further according to this embodiment, the storage unit may comprise more than four female coupling devices, as long as four of them are located at the corner points of the rectangular female coupling pattern. Possible further female coupling devices may be located at edges of the rectangular female coupling pattern, e.g. in between the corner points. For example, one edge of the rectangular female coupling pattern may comprise one or more further female coupling devices and another edge, e.g. an opposite edge, may also comprise one or more further female coupling devices, so that the overall pattern of the female coupling devices may be mirror symmetrical.

In an embodiment, the storage unit further comprises a handle that is rotatably connected to the top wall and that is configured to be rotated with respect to the top wall between a retracted position, in which the handle is substantially flush with the top wall, and an upright position, in which the handle projects away from the top wall in an upright direction.

The handle enables the storage unit to be portable in case it is desired to transport the storage unit in between subsequent uses. The handle is foldable by rotating it with respect to the top wall, so that it can be folded out into the upright direction to enable the storage unit to be carried by a user. When it is no longer desired to carry the storage unit, the handle can be folded in into the retracted position to ensure that the handle is flush with the top wall. In the flush and retracted position of the handle, the top wall of the storage unit is substantially flat. This enables another storage unit to be stacked on top of the top wall with the retracted handle.

This embodiment of the storage unit may lack the at least one male coupling device and/or the at least one female coupling device at or on the top wall. The top wall can thus be free of coupling devices, to obtain a fully flat top wall when the handle is in the retracted position.

Nonetheless, the bottom wall of this embodiment of the storage unit may comprise the at least one male coupling device and/or the at least one female coupling device to enable interlocking of this storage unit on top of another storage unit to prevent horizontal mutual movements between those.

The present invention further provides a modular desktop storage system for storing craft utensils, such as pens, pencils and/or markers, comprising a first modular storage unit as disclosed herein and a second modular storage unit as disclosed herein, wherein the second storage unit is arranged on top of the first storage unit, wherein the bottom wall of the second storage unit contacts the top wall of the first storage unit, and wherein either the male coupling device of the first storage unit interlocks with the female coupling device of the second storage unit, or wherein the female coupling device of the first storage unit interlocks with the male coupling device of the second storage unit, in order to prevent mutual horizontal movements of the second storage unit with respect to the first storage unit.

The storage units in the modular storage system may be provided identical or may have an identical outer contour. Furthermore, the female coupling devices may be arranged in a female coupling pattern that corresponds to a male coupling pattern in which the male coupling devices are arranged.

The male coupling devices of the first storage unit and the second storage unit may be provided at their respective bottom walls. Accordingly, their female coupling devices are then provided at their top walls. With the second storage unit arranged on the first storage unit, the male coupling devices of the second storage unit protrude into the female coupling devices of the first storage unit from above and the first storage unit may rest on a support surface, e.g. a desktop surface, with its male coupling devices.

Alternatively, the male coupling devices of the first storage unit and the second storage unit may be provided at their respective top walls. Accordingly, their female coupling devices are then provided at their bottom walls. With the second storage unit arranged on the first storage unit, the male coupling devices of the first storage unit protrude into the female coupling devices of the second storage unit from below and the first storage unit may rest on a support surface, e.g. a desktop surface, with its nominal horizontal bottom plane.

In the modular storage system according to the present invention, the interlocking of the coupling devices provides a shape-fit of the male coupling devices within the female coupling devices, thereby preventing mutual movements in a horizontal plane between the storage units that are stacked on top of each other. The modular storage system thereby provides the advantage of enabling convenient stacking of multiple storage units in the vertical direction, whilst preventing horizontal movements in between them by the interlocking male coupling devices and female coupling devices. This interlocking may prevent sideways shifting of the storage units and may prevent that the second storage unit can drop from the first storage unit. Instead, a rigid stack of storage units may be obtained that may only occupy a desktop footprint of a single storage unit. This means that the amount of desktop space needed to store a certain number of craft utensils is far less than with the known modular storage systems that only allow interconnection of the storage units in a horizontal plane.

Furthermore, the storage units of the modular storage system merely require the male coupling devices to be inserted in the female coupling devices to obtain the connection, wherein the coupling devices merely rely on gravitational forces, e.g. acting in the vertical direction, to hold them in place. For uncoupling the storage units, it would suffice to only lift an upper one of the storage units and it is not required to actively release the coupling, like with the snap-fit coupling in the known storage system. As such, the modular storage system according to the present invention can be used more flexibly and allows for an improved re-arrangement.

In an embodiment of the modular storage system, the first storage unit has a first width in the transverse horizontal direction and the second storage unit has a second width in the transverse horizontal direction. The second width amounts approximately 50% of the first width.

Additionally or alternatively, the first storage unit may have a first height in the vertical direction and the second storage unit may have a second height in the vertical direction. The second height may amount between approximately 50% and 200% of the first height.

Additionally or alternatively, the first storage unit may have a first length in the horizontal insertion direction and the second storage unit may have a second length in the horizontal insertion direction. The second length may amount between approximately 50% and 200% of the first length.

In a further embodiment, the modular storage system comprises two second, e.g. upper storage units. The second storage units, e.g. both of them, are arranged on the first storage unit, and the second storage units are arranged next to each other in the transverse horizontal direction.

This embodiment has the advantage that the modularity is not only present in the vertical direction, e.g. by stacking multiple storage units on top of each other, but also in the transverse horizontal direction, e.g. by providing storage units with different widths that allow for side-by-side placement.

In a different further embodiment, the modular storage system comprises two second, e.g. upper storage units, which both have a length in the horizontal insertion direction that is smaller than the length of the first, e.g. lower storage unit, for example 50% smaller. The second storage units, e.g. both of them, are arranged on the first storage unit, and the second storage units are arranged behind each other in the horizontal insertion direction.

This embodiment has the advantage that the modularity is not only present in the vertical direction, e.g. by stacking multiple storage units on top of each other, but also in the horizontal insertion direction, e.g. by providing storage units with different widths that allow for the placement behind one another.

When one of the second storage units, e.g. the rear one of the second storage units, is provided higher than the other one, e.g. the front one, both second storage units may be provided in a staggered configuration, allowing both of them to be accessible for a user, wherein the front one is for example suited for low craft utensils and wherein the rear one is for example suited for high craft utensils.

In a further embodiment, the bottom wall of each second storage unit comprises four male coupling devices that are mutually arranged to form corner points of a rectangular male coupling pattern and the top wall of the first storage unit comprises eight female coupling devices that are mutually arranged to form corner points of a first rectangular female coupling pattern and of a second rectangular female coupling pattern. The second storage units, e.g. which have a smaller width than the first storage unit but which are together just as wide as the first storage unit, thus each have fewer male coupling devices than the female coupling devices of the first storage unit. Furthermore, the first storage unit has four of its female coupling devices arranged to form corner points of a first rectangular female coupling pattern and has four others of its female coupling devices arranged to form corner points of a second rectangular female coupling pattern.

The rectangular male coupling pattern of each second storage unit corresponds to the rectangular female coupling patterns of the first storage unit. Hence, the location of the four male coupling devices of each second storage unit corresponds to the location of the four female coupling members in the first rectangular female coupling pattern of the first storage unit and to the location of the other four female coupling members in the second rectangular female coupling pattern of the first storage unit.

The male coupling devices of a first one of the second storage units interlocks with the four female coupling devices in the first rectangular female coupling pattern of the first storage unit and the male coupling devices of a second one of the second storage units interlocks with the four female coupling devices in the second rectangular female coupling pattern of the first storage unit.

The four female coupling devices in the first rectangular female coupling pattern are thus interconnected with the male coupling devices of the first one of the second storage units and the four other female coupling devices in the second rectangular female coupling pattern are thus interconnected with the female coupling devices of the second one of the second storage units. Accordingly, both second storage units are also connected to each other, e.g. indirectly, in the transverse horizontal direction via the first storage.

In an alternative embodiment, the bottom wall of each second storage unit comprises four female coupling devices that are mutually arranged to form corner points of a rectangular female coupling pattern and the top wall of the first storage unit comprises eight male coupling devices that are mutually arranged to form corner points of a first rectangular male coupling pattern and of a second rectangular male coupling pattern. The second storage units, e.g. which each have a smaller width than the first storage unit but which are together just as wide as the first storage unit, thus each have fewer female coupling devices than the male coupling devices of the first storage unit. Furthermore, the first storage unit has four of its male coupling devices arranged to form corner points of a first rectangular male coupling pattern and has four others of its male coupling devices arranged to form corner points of a second rectangular male coupling pattern.

The rectangular female coupling patterns of each second storage unit corresponds to the rectangular male coupling patterns of the first storage unit. Hence, the location of the four female coupling devices of each second storage unit corresponds to the location of the four male coupling members in the first rectangular male coupling pattern of the first storage unit and to the location of the other four male coupling members in the second rectangular male coupling pattern of the first storage unit.

The male coupling devices of a first one of the second storage units interlocks with the four male coupling devices in the first rectangular male coupling pattern of the first storage unit and the female coupling devices of a second one of the second storage units interlocks with the four male coupling devices in the second rectangular male coupling pattern of the first storage unit.

The four male coupling devices in the first rectangular male coupling pattern are thus interconnected with the female coupling devices of the first one of the second storage units and the four other male coupling devices in the second rectangular male coupling pattern are thus interconnected with the female coupling devices of the second one of the second storage units. Accordingly, both second storage units are also connected to each other, e.g. indirectly, in the transverse horizontal direction via the first storage.

Alternatively or additionally, a single first storage unit may be arranged on two second storage units. In such an embodiment, the bottom wall of the first storage unit may comprise eight male coupling devices or eight female coupling devices, and the top walls of the second storage units may respectively each comprise four female coupling devices or four male coupling devices, which may be arranged in a configuration as described above.

The present invention also provides a modular set of craft utensils, comprising a modular storage unit as disclosed herein and/or a modular storage system as disclosed herein, and a plurality of craft utensils, preferably elongate tubular craft utensils, for example pens, pencils and/or markers. The craft utensils are inserted at least partially in the interior of the storage unit along the horizontal insertion direction.

The storage units enable the craft utensils to be stored in an organized way, such that the user may directly see the specific type of craft utensil that he or she wishes to use, and at the right colour. Furthermore, the storage units are modular, which implies that the size of their storage spaces may differ between these different storage units, but that the outer contours may be the same. As a result, each of these storage units may receive craft utensils of a different size or shape, e.g. with a different cross-sectional area, whilst their modularity, e.g. the ability to be interconnected with other storage units, remains safeguarded due to the same outer contour.

In an embodiment, the set unit further comprises a grid, which is arranged in the interior of the storage unit and which defines a plurality of craft utensil storage spaces. Each craft utensil is individually inserted at least partially in a respective storage space.

With the grid, the entire interior of the storage unit is subdivided into multiple smaller storage spaces. Each storage space is configured to freely receive a single craft utensil in a way that insertion thereof is always possible, irrespective of whether other craft utensils are already present in the storage unit. Each storage space is accessible from the side, e.g. in the horizontal insertion direction, so that head ends of the craft utensils, which may generally display information about the type of craft utensil and/or its colour, may be visible for the user.

The grid may comprise one or more vertical grid walls in the interior of the storage unit, which extend in between the bottom wall and the top wall in the vertical direction, wherein the vertical grid walls define multiple craft utensil storage spaces arranged next to each other in the transverse horizontal direction.

The grid may further comprise one or more horizontal grid walls in the interior of the storage unit, which extend in between the side walls in the transverse horizontal direction, wherein the horizontal grid walls define multiple craft utensil storage spaces arranged above each other in the vertical direction.

Different storage units of the set may each comprise a different number of vertical grid walls and/or horizontal grid walls, so that a distance between two adjacent vertical grid walls and/or two adjacent horizontal grid walls may be different for each of the different storage units. As a result, the size of the storage spaces may differ between these different storage units, whilst their outer contours may be the same. As a result, each of these storage units may receive craft utensils of a different size or shape, e.g. with a different cross-sectional area, whilst the modularity of the storage units, e.g. the ability to be interconnected with other storage units, remains safeguarded due to the same outer contour.

BRIEF DESCRIPTION OF DRAWINGS

Further characteristics of the invention will be explained below, with reference to embodiments, which are displayed in the appended drawings, in which.

Throughout the figures, the same reference numerals are used to refer to corresponding components or to components that have a corresponding function.

DETAILED DESCRIPTION OF EMBODIMENTS

Figure 1:
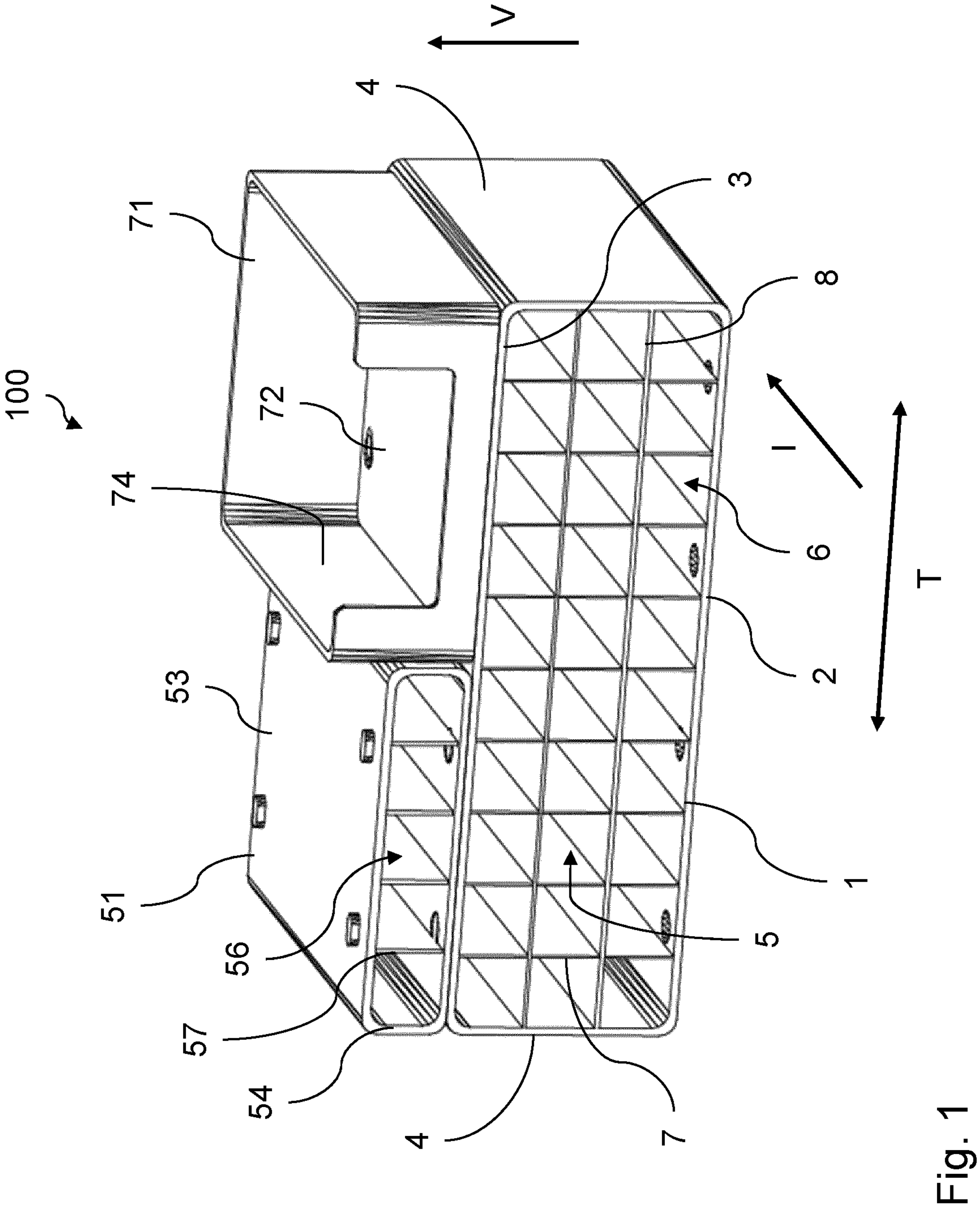
FIG. 1 schematically depicts an embodiment of the modular desktop craft utensils storage system according to the present invention.

FIG. 1 schematically depicts an embodiment of the modular desktop storage system for storing craft utensils, such as pens, pencils and/or markers, to which is referred with reference numeral 100. The storage system 100 comprises a first modular storage unit 1, a second modular storage unit 51 and a third storage unit 71.

The first storage unit 1 comprises a bottom wall 2, a top wall 3, spaced in a vertical direction V at a distance from the bottom wall 2, and two side walls 4, each vertically extending in between the bottom wall 2 and the top wall 3 at opposite sides thereof. The walls 2, 3, 4 of the storage unit 1 are integrally connected to each other and are made of a plastic material, being manufactured by means of an injection-moulding process.

The bottom wall 2, the top wall 3 and the side walls 4 of the first storage unit 1 together define an interior 5 of the storage unit 1 for receiving one or more craft utensils along a horizontal insertion direction I.

The second storage unit 51 also comprises a bottom wall 52, a top wall 53 and two side walls 54 and the third storage unit 71 comprises a bottom wall 72 and two side walls 74, whilst being open at the top for receiving craft utensils and/or stationery articles. The third storage unit 71 lacks a top wall that is fixedly attached to its side walls 74, but instead comprises a top wall that is provided as a separate cover, e.g. not shown in the figures, that can be removably attached to the side walls 74 of the storage unit 71.

Figure 2:
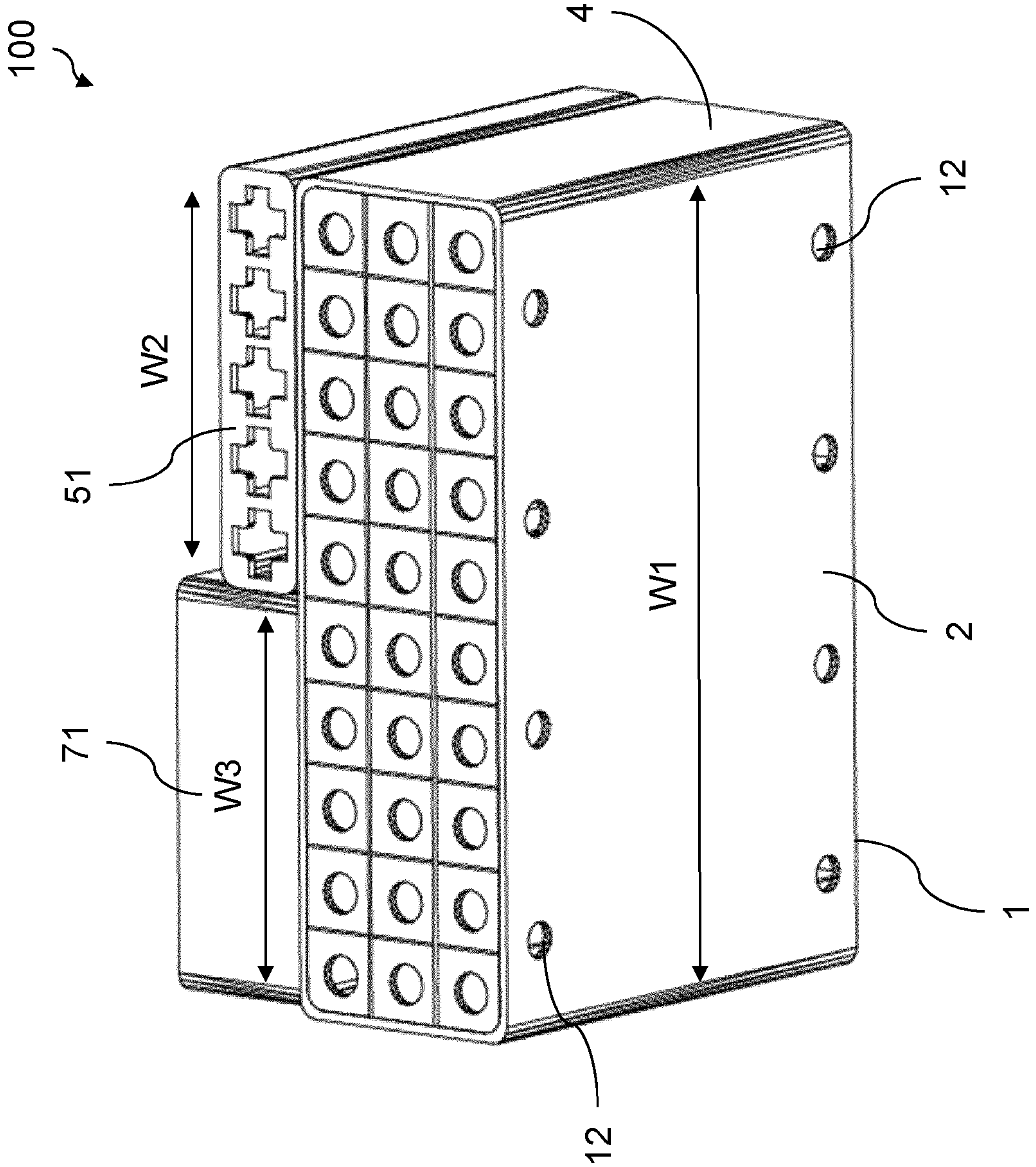
FIG. 2 depicts a rear view on the system of FIG. 1.

The second storage unit 51 and the third storage unit 71 are arranged on top of the first storage unit 1. The first storage unit 1 has a first width W1 in a transverse horizontal direction T, e.g. a horizontal direction aligned perpendicular to the horizontal insertion direction I, as is best shown in FIG. 2. The second storage unit 51 has a second width W2 and the third storage unit 71 has a third width W3 in the transverse horizontal direction T. The second width W2 and the third width W3 amount approximately 50% of the first width W1.

The second storage unit 51 and the third storage unit 71 are stacked on the first storage unit 1 and are arranged next to each other in the transverse horizontal direction T.

Figure 4:
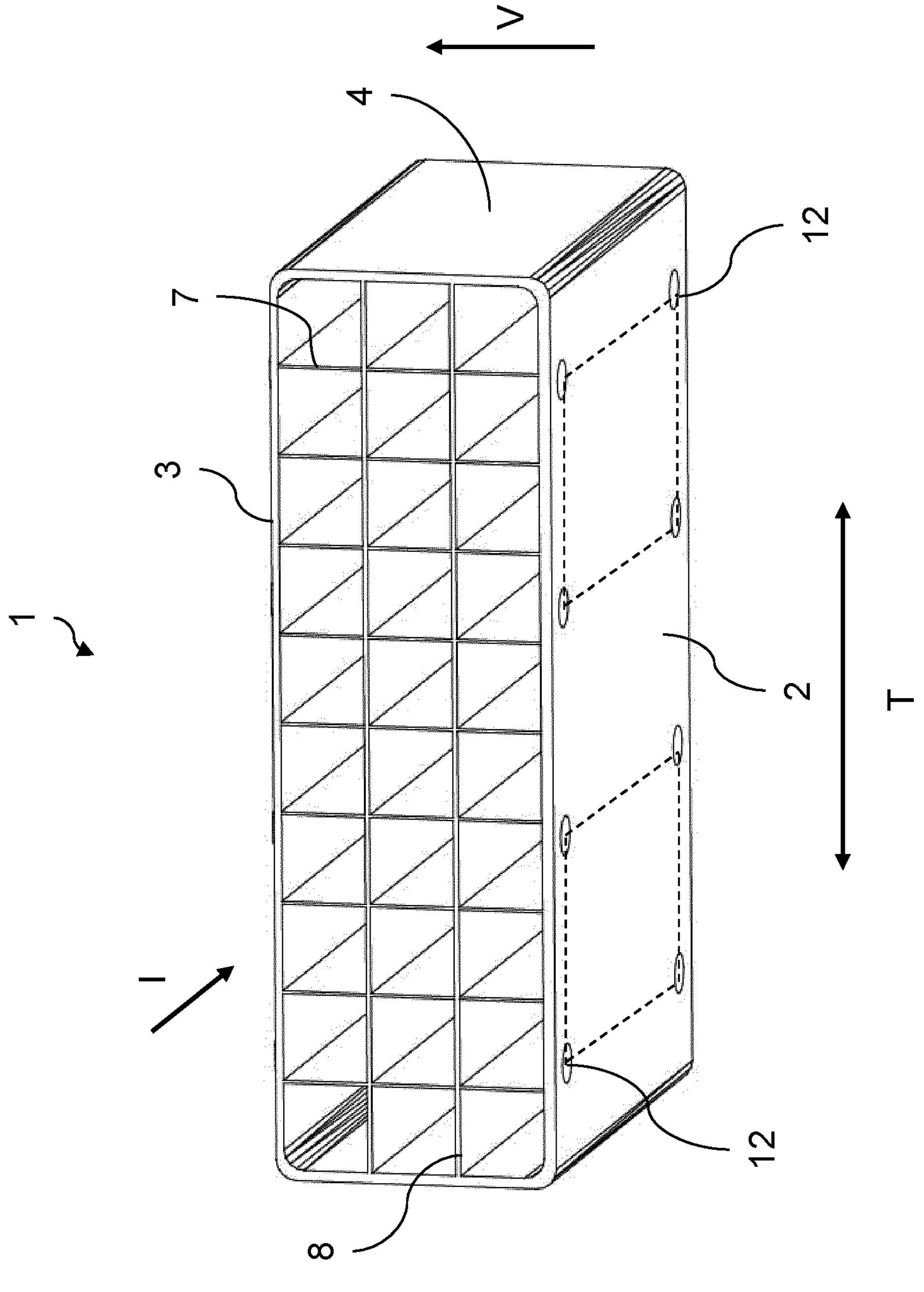

The first storage unit 1 comprises grid in its interior 5, as is also shown in FIG. 4. With the grid, the entire interior 5 of the first storage unit 1 is subdivided into a plurality of craft utensil storage spaces 6. Each storage space 6 is accessible from the side and adapted to receive a single craft utensil, which is to be inserted therein in the horizontal insertion direction I.

The grid comprises nine vertical grid walls 7 in the interior 5 of the first storage unit 1, which extend in between the bottom wall 2 and the top wall 3 in the vertical direction V. The vertical grid walls 7 define, together with the side walls 4 on both sides, rows of ten craft utensil storage spaces 6 arranged next to each other in the transverse horizontal direction T.

The grid further comprises two horizontal grid walls 8 in the interior 5 of the first storage unit 1, which extend in between the side walls 4 in the transverse horizontal direction T. The horizontal grid walls 8 define, together with the bottom wall 2 and the top wall 3, columns of three craft utensil storage spaces 6 arranged above each other in the vertical direction V.

Figure 3:
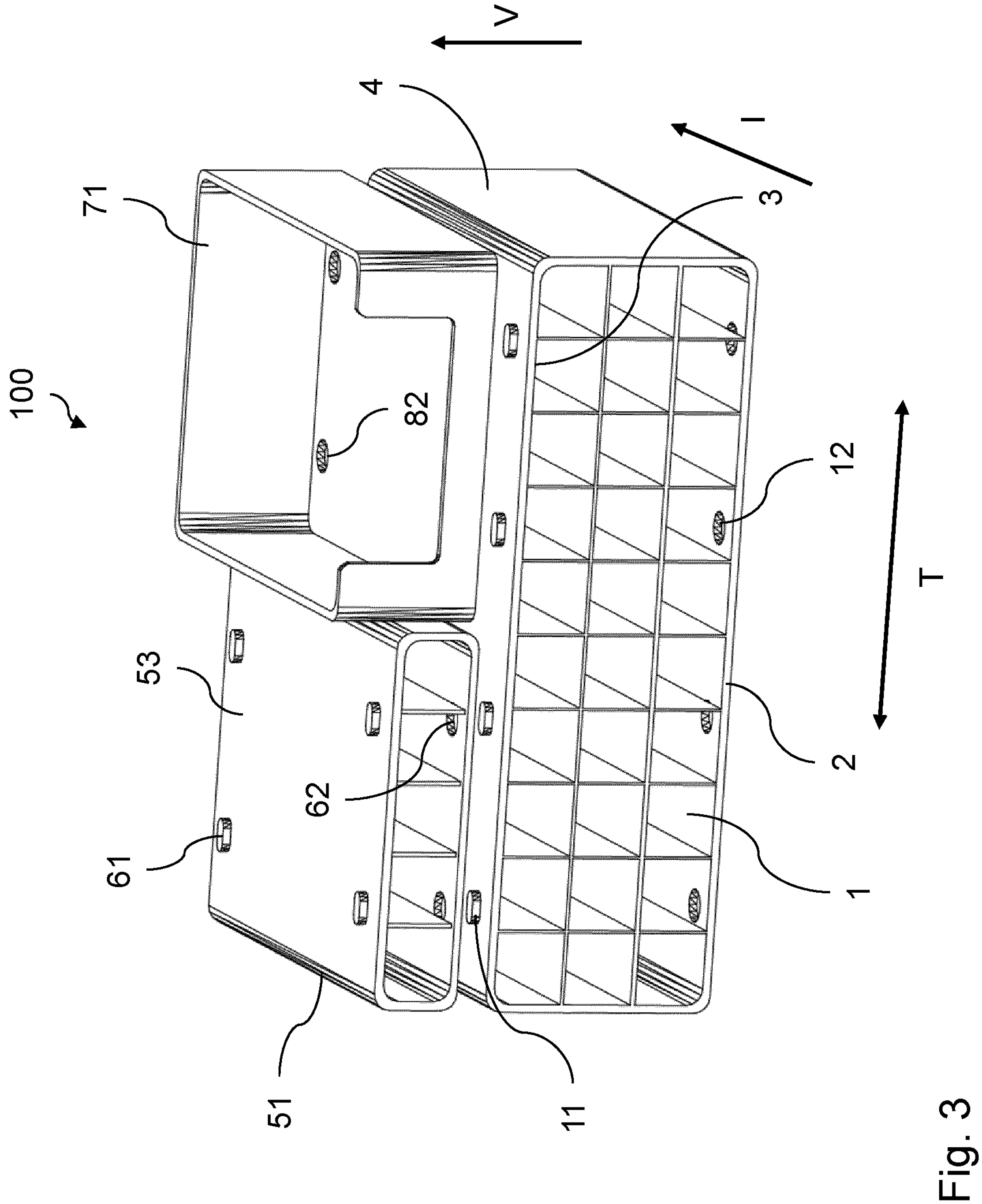
FIG. 3 depicts the system of FIG. 1 in an exploded-view representation, in which the storage units are spaced from each other, FIG. 4 schematically depicts an embodiment of the modular desktop craft utensils storage unit according to the present invention, FIG. 5 schematically depicts a top view on the storage unit of FIG. 4, FIG. 6 schematically depicts a bottom view on the upper storage units of the storage system of FIG. 1, FIG. 7A schematically depicts a rear view on another embodiment of the modular desktop craft utensils storage system according to the present invention.

It is shown in FIG. 1 that the second storage unit 51 does not comprise any horizontal grid walls and only comprises four vertical grid walls 57 to define a row of five craft utensil storage spaces 56 arranged next to each other in the transverse horizontal direction T It is best shown in FIGS. 3 and 4 that the storage units 1, 51, 71 each comprise coupling devices, which are configured to interlock with coupling devices of another storage unit.

The first storage unit 1 comprises eight male coupling devices 11 at its top wall 3, which protrude from the respective top wall 3 in an upward vertical direction V. The male coupling devices 11 have an elevated profile and project above a nominal plane of the top wall 3. Each of the male coupling devices 11 has an elongate, e.g. a rectangular cross-section with rounded corners, when seen in the vertical direction V. The male coupling devices 11 each substantially extend in the transverse horizontal direction T, as is best shown in FIG. 5.

The first storage unit 1 further comprises eight female coupling devices 12 in its bottom wall 2, which are each formed by a recess in the bottom wall 2. Compared to a nominal plane of the respective bottom wall 2, the female coupling devices 12 have a depressed profile. Seen in the vertical direction V, the female coupling devices 12 each have a circular cross-section. A horizontal width of the rectangular male coupling devices 11 substantially corresponds to the diameter of the circular female coupling devices 12. The female coupling devices 12 are provided as through openings, which extend through the entire bottom wall 2, e.g. into the interior 5 of the first storage unit 1.

Figure 5:
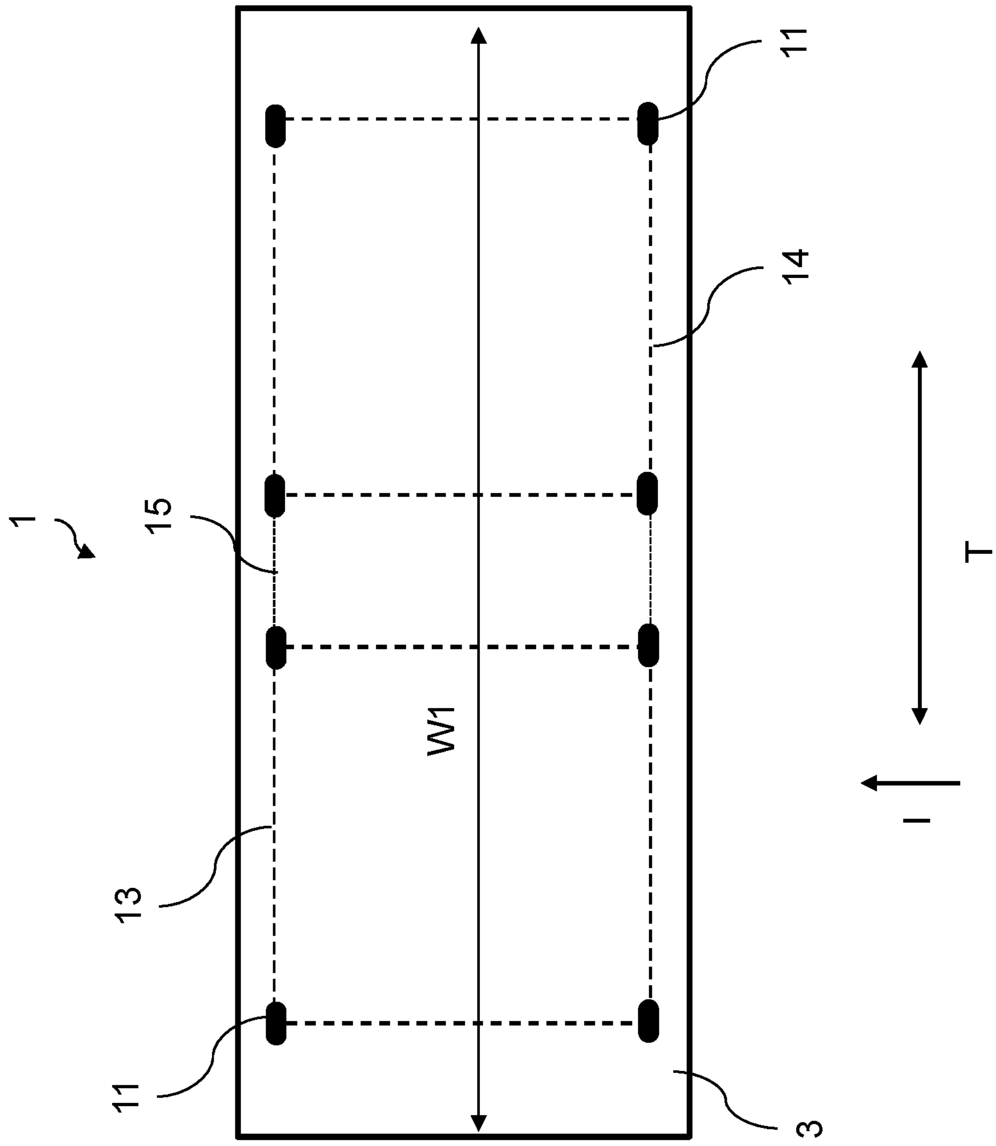

It is best shown in FIG. 5 that the eight male coupling devices 12 at the top wall 3 of the first storage unit 1 are mutually arranged, so that four of them form corner points of a first rectangular, e.g. square male coupling pattern 13 and that four others of them form a second rectangular, e.g. square male coupling pattern 14.

It is shown that four of the male coupling devices 11 are located at the corner points of a combined rectangular male coupling pattern 15. Hence, the other male coupling devices 11, e.g. not forming the corner points of the combined rectangular male coupling pattern 15, are located at the edges of this pattern 15, e.g. in between the corner points.

Similarly, the second storage unit 51 comprises four male coupling devices 61 at its top wall 53 and comprises four female coupling devices 62 in its bottom wall 52. The third storage unit 71 is free of a top wall but does comprise four female coupling devices 82 in its bottom wall 72.

Figure 6:
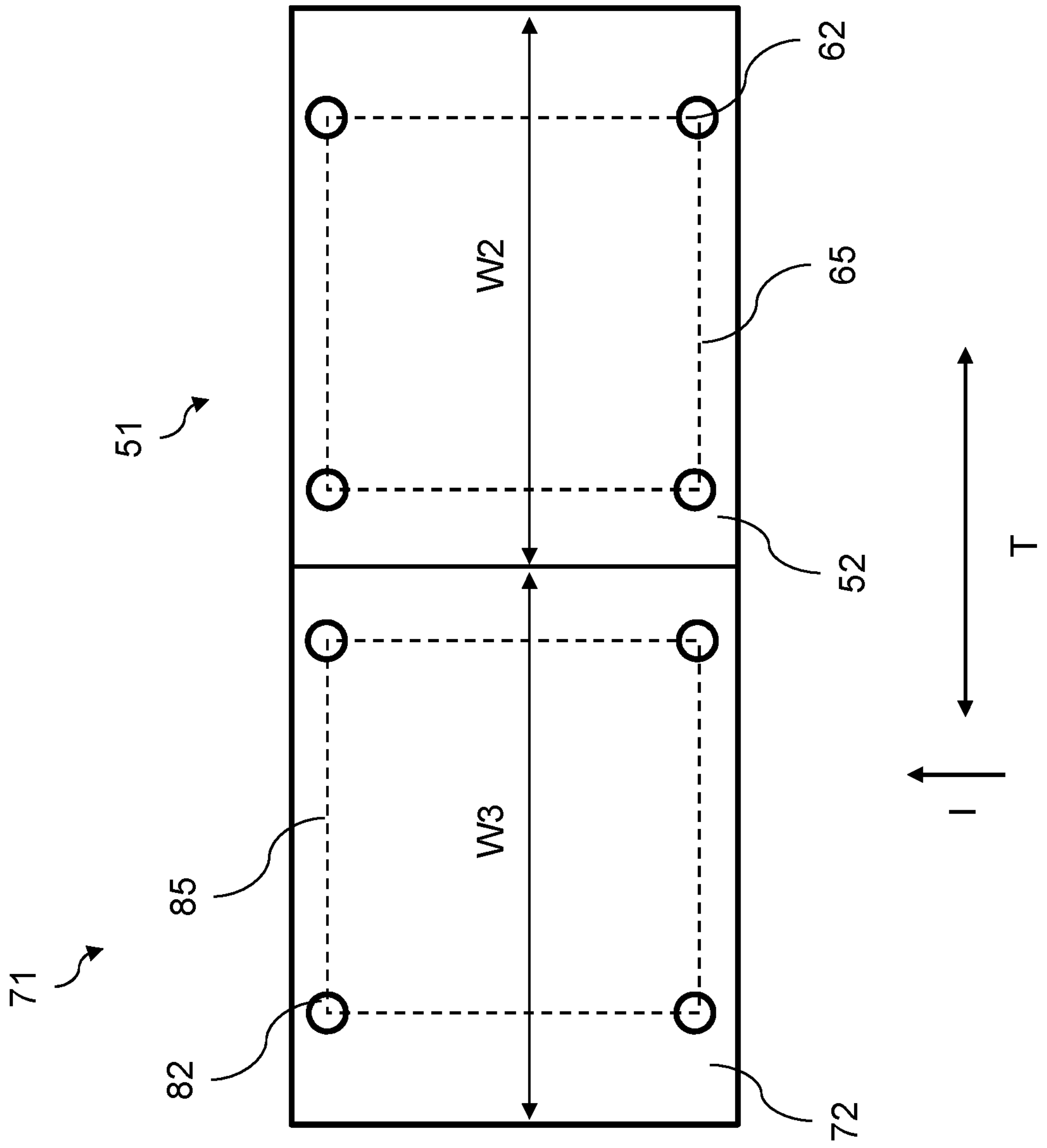

It is best shown in FIG. 6 that the second storage unit 51 has a width W2 and the third storage unit 71 has a width W3 that are both smaller than the width W1 of the first storage unit 1, but which are together just as wide as the first storage unit 1. The four female coupling devices 62 of the second storage unit 51 are arranged in a rectangular, e.g. square female coupling pattern 65 and the four female coupling devices 82 of the second storage unit 71 are arranged in a rectangular, e.g. square female coupling pattern 85 as well.

The first rectangular male coupling pattern 13 of the first storage unit 1 corresponds to the rectangular female coupling pattern 65 of the second storage unit 51. Hence, the locations of four of the male coupling devices 11 of the first storage unit 1 correspond to the locations of the four female coupling members 62 in the rectangular female coupling pattern 65 of the second storage unit 51. The locations of four others of the male coupling devices 11 of the first storage unit 1 correspond to the location of the four female coupling members 82 in the rectangular female coupling pattern 85 of the third storage unit 71.

With the second storage unit 51 being arranged on top of the first storage unit 1, the bottom wall 52 of the second storage unit 51 contacts the top wall 3 of the first storage unit 1. Four of the male coupling devices 11 of the first storage unit 1 thereby interlock with the female coupling devices 62 in the bottom wall 52 of the second storage unit 51, in order to prevent mutual horizontal movements of the second storage unit 51 with respect to the first storage unit 1.

Accordingly, with the third storage unit 71 being arranged on top of the first storage unit 1, the bottom wall 72 of the third storage unit 71 contacts the top wall 3 of the first storage unit 1. Four others of the male coupling devices 11 of the first storage unit 1 thereby interlock with the female coupling devices 82 in the bottom wall 72 of the third storage unit 71, in order to prevent mutual horizontal movements of the third storage unit 71 with respect to the first storage unit 1.

In particular, four of the male coupling devices 11 of the first storage unit 1 are adapted to interlock with the female coupling devices 62 of the second storage unit 51 and four others of the male coupling devices 11 of the first storage unit 1 are adapted to interlock with the female coupling devices 82 of the third storage unit 71. This interlocking is effected by the male coupling devices 11 that are being inserted in the female coupling devices 62, 82 to obtain the connection, wherein the coupling devices 11, 62, 82 merely rely on gravitational forces, e.g. acting in the vertical direction V, to hold them in place.

Figure 7A:
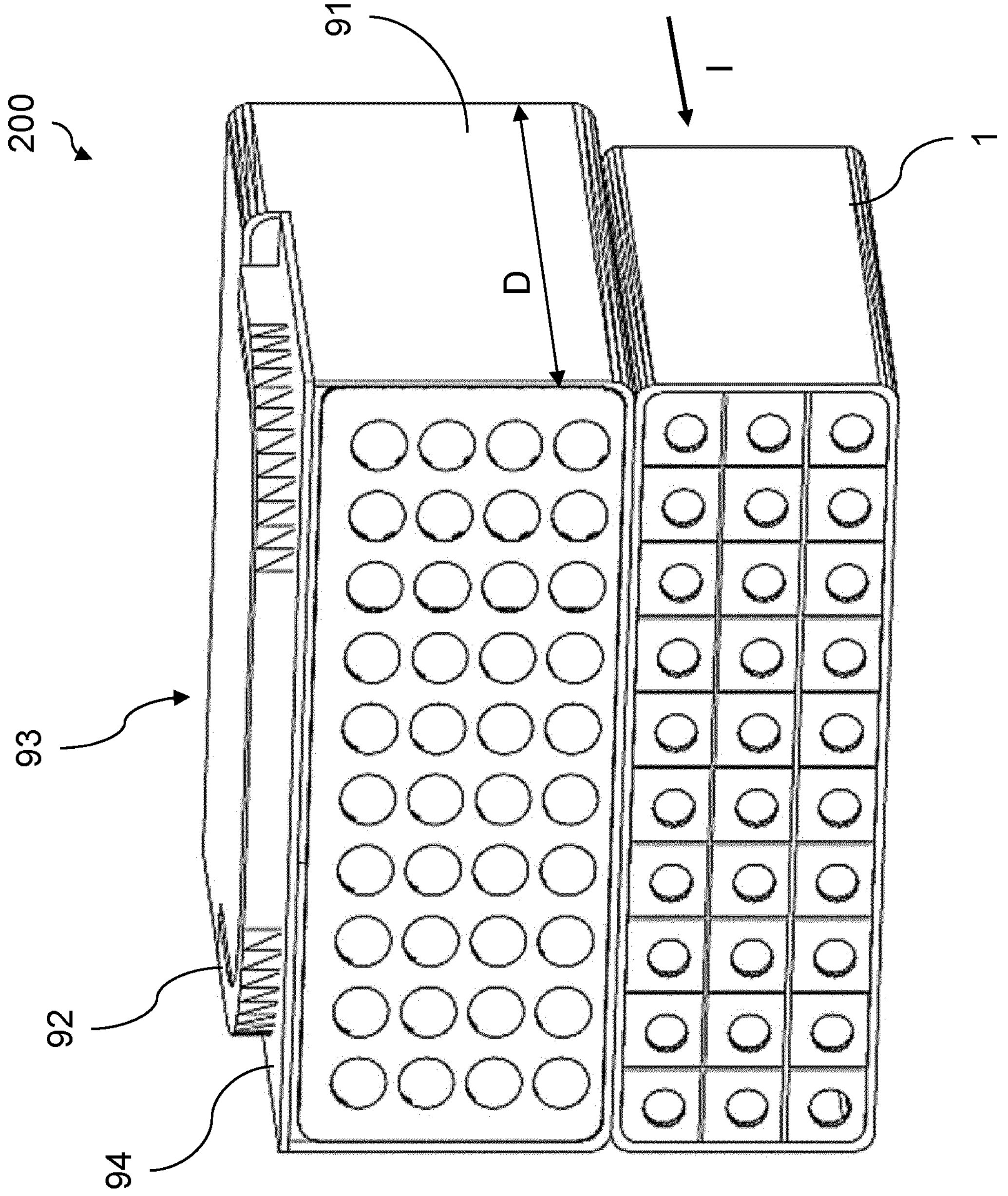
FIG. 7B depicts a top view on the system of FIG. 7A, and FIG. 8 schematically depicts a front view on the system of FIG. 7A.

FIG. 7A schematically depicts a rear view on another embodiment of the modular desktop craft utensils storage system according to the present invention, to which is referred with reference numeral 200. The system 200 comprises the first storage unit 1 shown in FIG. 1 and comprises another storage unit 91 stacked thereon. Compared to the first storage unit 1, the upper storage unit 91 has a depth D in the horizontal insertion direction I. The upper storage unit 91 comprises a top wall 93 with a handle 92 attached thereto.

The handle 92 is rotatably connected to the top wall 93 and is configured to be rotated with respect to the top wall 93 between a retracted position, in which the handle 92 is substantially flush with the top wall 93, and an upright position, in which the handle 92 projects away from the top wall 93 in an upright direction.

Figure 7B:
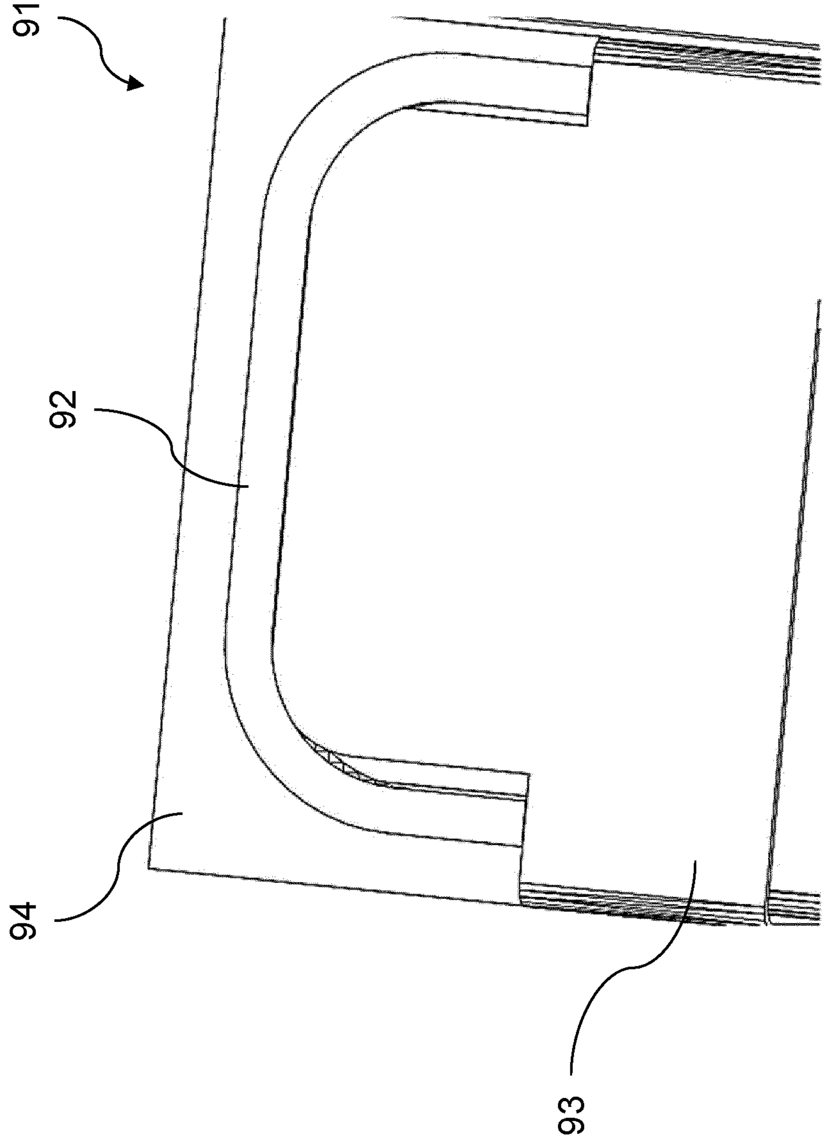

In FIGS. 7A and 7B, the handle is displayed in the retracted position. In particular FIG. 7B shows that the handle 92 is flush with the top wall 93. The storage unit 91 comprises a recessed part 94, vertically located below the top wall 93, in which the handle 92 is accommodated in the retracted position.

The upper storage unit 91 lacks any male coupling device on the top wall 93, so that the top wall 92 is substantially fully flat when the handle 92 is in the retracted position.

Figure 8:
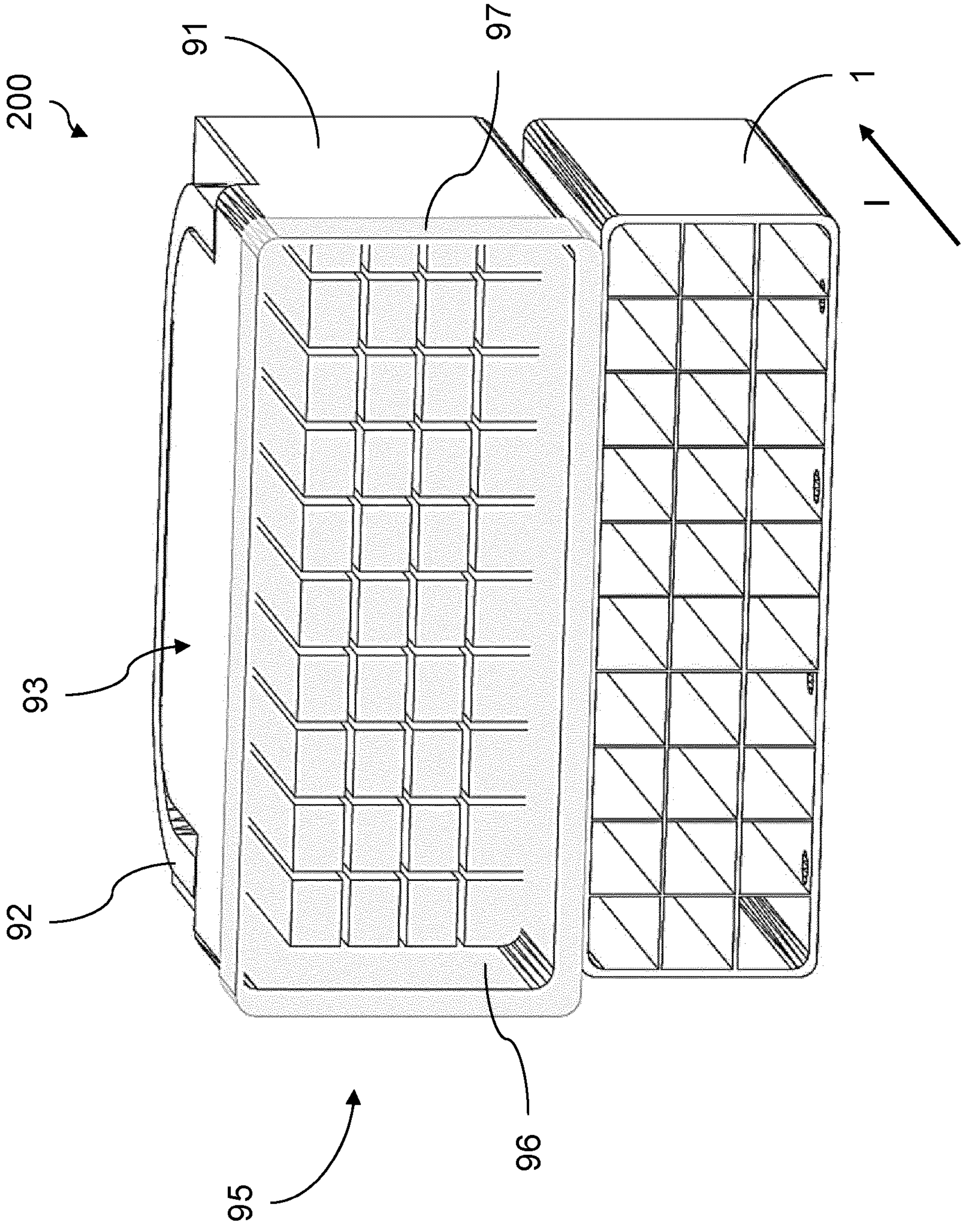

FIG. 8 schematically depicts a front view on the storage system 200 of FIGS. 7A and 7B. It is shown in FIG. 8 that the upper storage unit 91 further comprises a transparent cover element 95, which is removably positioned against the walls of the storage unit 91. The cover 95 is thereby intended to cover the plurality of craft utensil storage spaces from the front.

The cover element 95 is provided at a frontal side of the storage unit 91, seen along the horizontal insertion direction I. As such, the cover element 95 is configured to prevent access into the interior from outside the storage unit 91 and to prevent undesired removal of writing utensils out of the interior.

The cover element 95 comprises a head wall 96, which is aligned perpendicular to the top wall 93 of the storage unit 91 when the cover element 95 is installed against the walls of the storage unit 91. The cover element 95 further comprises an annular rim 97, attached to the head wall 96, with which the cover element 95 abuts the walls of the storage unit 91. An outer contour of the annular rim 97 substantially corresponds to the outer contour of the storage unit 91, being substantially flush therewith.

The annular rim 97 comprises a recessed part, which has an outer contour that corresponds to an inner contour of the of the storage unit 91. The recessed part is inserted in the interior of the storage unit 91, to let the cover element 95 interlock with the walls of the storage unit 91 by means of its annular rim 97, i.e. by obtaining a shape fit between the annular rim 97 and the walls of the storage unit 91.

The invention claimed is:

1. A modular desktop craft utensils storage unit for storing writing craft utensils, comprising:

a bottom wall, a top wall, which is spaced in a vertical direction at a distance from the bottom wall, and two side walls, each vertically extending in between the bottom wall and the top wall at opposite sides thereof, wherein the bottom wall, the top wall and the side walls together define an interior of the storage unit for receiving one or more craft utensils along a horizontal insertion direction, wherein the storage unit further comprises a coupling device, which is configured to interlock with a coupling device of a second storage unit to interconnect the storage unit and the second storage unit to each other, wherein one of the bottom wall or the top wall comprises at least one male coupling device, which protrudes from the respective bottom wall or top wall in a vertical direction during use of the storage unit, wherein the vertical direction is aligned perpendicular to the horizontal insertion direction, wherein the other one of bottom wall or the top wall comprises at least one female coupling device, which is formed by a recess in the respective bottom wall or top wall, and wherein the male coupling device of the storage unit is adapted to be inserted in the female coupling device of the second storage unit in the vertical direction and wherein the female coupling device of the storage unit is adapted to receive the male coupling device of a third storage unit in order to prevent horizontal mutual movements of the storage unit with respect to the second storage unit and the third storage unit, wherein the storage unit further comprises a grid, which is arranged in the interior of the storage unit and which defines multiple craft utensil storage spaces, wherein each storage space is adapted to receive a single craft utensil, to be inserted therein in the horizontal insertion direction, wherein the grid comprises one or more vertical grid walls in the interior of the storage unit, which extend in between the bottom wall and the top wall in the vertical direction, wherein the vertical grid walls define the multiple craft utensil storage spaces arranged next to each other in the transverse horizontal direction, and wherein the bottom wall, the top wall, the side walls, and the grid are made of a plastic material and together form a one-piece, monolithic unitary structure.

2. The modular storage unit according to claim 1, wherein the male coupling device has an elongate cross-section, when seen in the vertical direction, wherein the female coupling device has a circular cross-section, when seen in the vertical direction, and wherein a horizontal width of the elongate male coupling device substantially corresponds to the diameter of the circular female coupling device.

3. The modular storage unit according to claim 2, wherein the male coupling devices substantially extends in a transverse horizontal direction, aligned perpendicular to the horizontal insertion direction, and wherein the horizontal width of this elongate male coupling device in the transverse horizontal direction substantially corresponds to the diameter of the circular female coupling device.

4. The modular storage unit according to claim 1, wherein the grid comprises one or more horizontal grid walls in the interior of the storage unit, which extend in between the side walls in the transverse horizontal direction, and wherein the horizontal grid walls define the multiple craft utensil storage spaces arranged above each other in the vertical direction.

5. The modular storage unit according to claim 1, wherein the storage unit comprises a drawer, which is slidably arranged at least partially in the interior of the storage unit and which comprises a reception volume for receiving craft utensils and/or stationery articles.

6. The modular storage unit according to claim 1, further comprising a cover element, which is removably positioned against the walls of the storage unit to cover the plurality of craft utensil storage spaces from the front.

7. The modular storage unit according to claim 6, wherein the cover element is a transparent cover element.

8. The modular storage unit according to claim 6, further comprising an elastic band, configured to be positioned to surround the storage unit and to hold the cover element in place against the walls and/or to hold the drawer at least partially in the interior of the storage unit.

9. The modular storage unit according to claim 1, comprising four male coupling devices and four female coupling devices, wherein the four male coupling devices are mutually arranged to form corner points of a rectangular male coupling pattern, wherein the four female coupling devices are mutually arranged to form corner points of a rectangular female coupling pattern, wherein the rectangular male coupling pattern substantially corresponds to the rectangular female coupling pattern.

10. The modular storage unit according to claim 1, further comprising a handle that is rotatably connected to the top wall and that is configured to be rotated with respect to the top wall between a retracted position, in which the handle is substantially flush with the top wall, and an upright position, in which the handle projects away from the top wall in an upright direction.

11. A modular desktop craft utensils storage system for storing craft utensils, comprising a first one of the modular desktop craft utensils storage units according to claim 1 and a second one of the modular desktop craft utensils storage units according to claim 1, wherein the second one of the storage units is arranged on top of the first one of the storage units, wherein the bottom wall of the second one of the storage units contacts the top wall of the first one of the storage units, and wherein the male coupling device of the first one of the storage units is inserted in with the female coupling device of the second one of the storage units, or wherein the female coupling device of the first one of the storage units receives the male coupling device of the second one of the storage units in order to prevent mutual horizontal movements of the second one of the storage units with respect to the first one of the storage units.

12. The modular storage system according to claim 11, wherein the first one of the storage units has a first width in the transverse horizontal direction, wherein the second one of the storage units has a second width in the transverse horizontal direction, and wherein the second width amounts approximately 50% of the first width.

13. The modular storage system according to claim 12, comprising two of the second ones of the storage units, wherein the second ones of the storage units are arranged on the first one of the storage units, and wherein the second ones of the storage units are arranged next to each other in the transverse horizontal direction.

14. The modular storage system according to claim 13, wherein the bottom wall of each of the second ones of the storage units comprises four male coupling devices that are mutually arranged to form corner points of a rectangular male coupling pattern, wherein the top wall of the first one of the storage units comprises eight female coupling devices that are mutually arranged to form corner points of a first rectangular female coupling pattern and of a second rectangular female coupling pattern, wherein the rectangular male coupling pattern of each of the second ones of the storage units corresponds to the rectangular female coupling patterns of the first one of the storage units, and wherein the male coupling devices of one of the second ones of the storage units interlocks with the female coupling devices in the first rectangular female coupling pattern of the first one of the storage units and wherein the male coupling devices of another one of the second ones of the storage units interlocks with the female coupling devices in the second rectangular female coupling pattern of the first one of the storage units.

15. The modular storage system according to claim 14, wherein the bottom wall of each of the second ones of the storage units comprises four female coupling devices that are mutually arranged to form corner points of a rectangular female coupling pattern, wherein the top wall of the first ones of the storage units comprises eight male coupling devices that are mutually arranged to form corner points of a first rectangular male coupling pattern and of a second rectangular male coupling pattern, wherein the rectangular female coupling patterns of each of the second ones of the storage units corresponds to the rectangular male coupling patterns of the first one of the storage units, and wherein the female coupling devices of one of the second ones of the storage units interlocks with the male coupling devices in the first rectangular male coupling pattern of the first one of the storage units and wherein the female coupling devices of another one of the second ones of the storage units interlocks with the male coupling devices in the second rectangular male coupling pattern of the first one of the storage units.

16. The modular set of craft utensils, comprising:

the modular storage unit according to claim 1, and a plurality of craft utensils, wherein the craft utensils are inserted at least partially in the interior of the storage unit along the horizontal insertion direction.

17. The modular set according to claim 16, wherein each craft utensil is individually inserted at least partially in a respective storage space.

18. A modular desktop craft utensils storage unit for storing writing craft utensils, comprising:

a bottom wall, a top wall, which is spaced in a vertical direction at a distance from the bottom wall, and two side walls, each vertically extending in between the bottom wall and the top wall at opposite sides thereof, wherein the bottom wall, the top wall and the side walls together define an interior of the storage unit having a plurality of craft utensil storage spaces for receiving one or more craft utensils along a horizontal insertion direction, wherein the storage unit further comprises a coupling device, which is configured to interlock with a coupling device of a second storage unit to interconnect the storage unit and the second storage unit to each other, wherein one of the bottom wall or the top wall comprises at least one male coupling device, which protrudes from the respective bottom wall or top wall in a vertical direction during use of the storage unit, wherein the vertical direction is aligned perpendicular to the horizontal insertion direction, wherein the other one of bottom wall or the top wall comprises at least one female coupling device, which is formed by a recess in the respective bottom wall or top wall, and wherein the male coupling device of the storage unit is adapted to be inserted in the female coupling device of the second storage unit in the vertical direction and wherein the female coupling device of the storage unit is adapted to receive the male coupling device of a third storage unit in order to prevent horizontal mutual movements of the storage unit with respect to the second storage unit and the third storage unit, wherein the storage unit further comprises a cover element, which is removably positioned against the walls of the storage unit to cover the plurality of craft utensil storage spaces from the front, wherein the cover element is a transparent cover element, and further comprising an elastic band, configured to be positioned to surround the storage unit and to hold the cover element in place against the walls and/or to hold a drawer at least partially in the interior of the storage unit.

19. A modular desktop craft utensils storage system for storing craft utensils, comprising a first and a second modular desktop craft utensils storage unit for storing writing craft utensils, each comprising:

a bottom wall, a top wall, which is spaced in a vertical direction at a distance from the bottom wall, and two side walls, each vertically extending in between the bottom wall and the top wall at opposite sides thereof, wherein the bottom wall, the top wall and the side walls together define an interior of the first and second storage units for receiving one or more craft utensils along a horizontal insertion direction, wherein the first storage unit further comprises a coupling device, which is configured to interlock with a coupling device of a second storage unit to interconnect the first storage unit and the second storage unit to each other, wherein one of the bottom wall or the top wall comprises at least one male coupling device, which protrudes from the respective bottom wall or top wall in a vertical direction during use of the first and second storage units, wherein the vertical direction is aligned perpendicular to the horizontal insertion direction, wherein the other one of bottom wall or the top wall comprises at least one female coupling device, which is formed by a recess in the respective bottom wall or top wall, and wherein the male coupling device of the first storage unit is adapted to be inserted in the female coupling device of the second storage unit in the vertical direction and wherein the female coupling device of the first storage unit is adapted to receive a male coupling device of a third storage unit in order to prevent horizontal mutual movements of the first storage unit with respect to the second storage unit and the third storage unit, wherein the second storage unit is arranged on top of the first storage unit, wherein the bottom wall of the second storage unit contacts the top wall of the first storage unit, and wherein the male coupling device of the first storage unit is inserted in with the female coupling device of the second storage unit, or wherein the female coupling device of the first storage unit receives the male coupling device of the second storage unit in order to prevent mutual horizontal movements of the second storage unit with respect to the first storage unit, wherein the first storage unit has a first width in the transverse horizontal direction, wherein the second storage unit has a second width in the transverse horizontal direction, and wherein the second width amounts approximately 50% of the first width, wherein the modular storage system comprises two of the second storage units, wherein the two second storage units are arranged on the first storage unit, and wherein the two second storage units are arranged next to each other in the transverse horizontal direction, wherein the bottom wall of each of the two second storage units comprises four male coupling devices that are mutually arranged to form corner points of a rectangular male coupling pattern, and wherein the top wall of the first storage unit comprises eight female coupling devices that are mutually arranged to form corner points of a first rectangular female coupling pattern and of a second rectangular female coupling pattern, wherein the rectangular male coupling pattern of each of the two second storage units corresponds to the rectangular female coupling patterns of the first storage units, and wherein the male coupling devices of one of the two second storage units interlocks with the female coupling devices in the first rectangular female coupling pattern of the first storage units and wherein the male coupling devices of another one of the two second storage units interlocks with the female coupling devices in the second rectangular female coupling pattern of the first storage unit.

* * * * *